April 6, 1965 K. W. REIMERS 3,176,655
CHAIN HOLD DOWN MEANS FOR CORNER UNIT OF
CIRCUITOUS CONVEYOR TROUGH
Filed Nov. 19, 1962 2 Sheets-Sheet 1
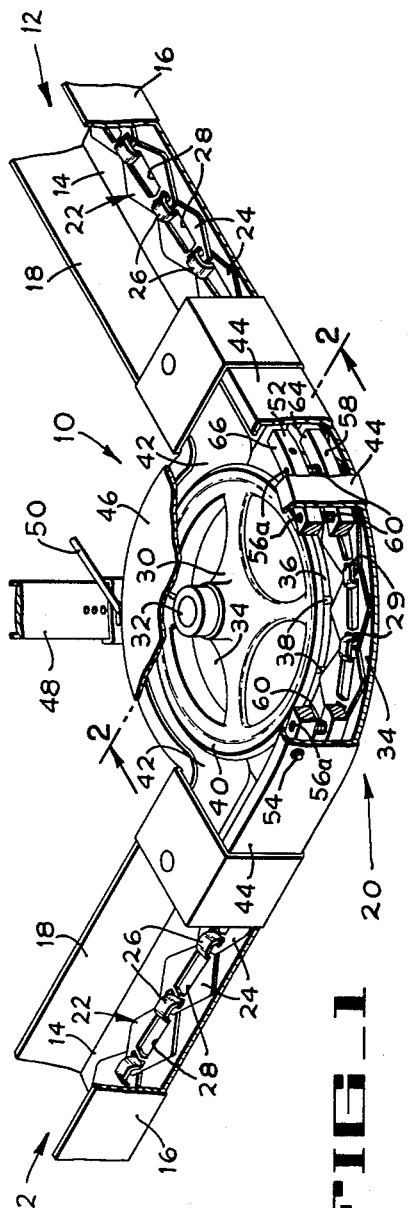
INVENTOR
KIRK W. REIMERS
BY Hans F. Hoffmeister
ATTORNEY

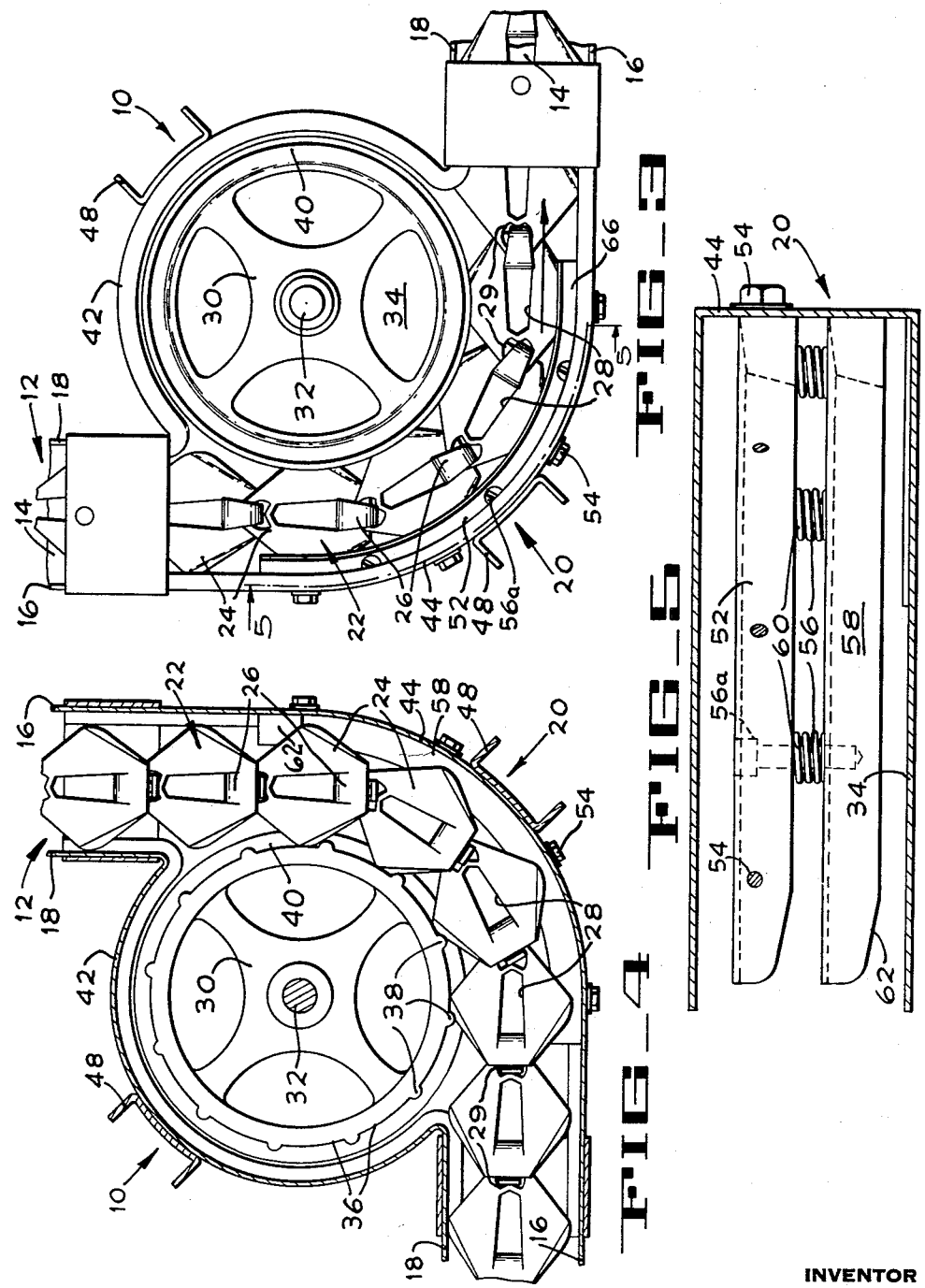

United States Patent Office 3,176,655
Patented Apr. 6, 1965

3,176,655
CHAIN HOLD DOWN MEANS FOR CORNER UNIT OF CIRCUITOUS CONVEYOR TROUGH
Kirk W. Reimers, Lincoln, Nebr., assignor to FMC Corporation, San Jose, Calif., a corporation of Delaware
Filed Nov. 19, 1962, Ser. No. 238,476
8 Claims. (Cl. 119—61)

This invention pertains to a conveyor and more particularly to an improved guide mechanism for stabilizing a flexible chain adapted for moving loose granular material, such as chicken feed, along a feed conduit having a curved section therein.

The distribution of poultry feed by automatic conveyors is well known. It is often desirable to convey feed through a trough which forms a complete loop so that fewer conveyor units are required. In such feed distribution systems, the conveyor chains must successfully negotiate lateral turns without excessive friction or trough wear. Furthermore, the conveyor should not jam when objects such as corn cobs, peanut hulls, chopped wood shavings, etc., which are frequently used for litter and accidentally get into the feed conduit, are conveyed to the curved section. Finally, it is desirable to prevent feed and other materials from packing in under the conveyor chain.

An object of the present invention is to provide an improved feed conveyor corner guide to reduce friction and trough wear.

Another object of the invention is to provide a feed conveyor corner guide which will maintain alignment of a conveyor and will permit larger objects such as corn cobs to pass by without jamming the conveyor.

Another object of the invention is to provide a feed conveyor corner guide which will maintain alignment of a conveyor so that there will be a minimum loss of material by spillage and packing as the conveyor moves around a corner.

Another object of the invention is to provide a feed conveyor corner guide which may be economically manufactured and readily installed.

Other objects and advantages of the invention will be apparent from the following detailed description, reference being made to the annexed drawing, in which:

FIGURE 1 is a partially cut-away perspective of a feed conveyor corner guide in which the present invention is embodied.

FIGURE 2 is a section taken on the line 2—2 of FIGURE 1.

FIGURE 3 is a plan of the feed conveyor corner guide shown in FIGURE 1 with the top cover removed.

FIGURE 4 is a bottom plan view of the corner guide shown in FIGURE 1 with parts in section.

FIGURE 5 is a side elevation of the arcuate corner of the trough of FIG. 3 with the chain removed from the trough, the view being broken away as indicated by line 5—5 of FIG. 3, and particularly showing the spaced guide members secured to the wall of the trough.

With reference to the drawings, and more particularly to FIGURE 1, a poultry feed conveyor 10 is shown. The poultry feed conveyor includes a feed trough 12 having a bottom 14 and side walls 16 and 18. The feed trough is open at the top along straight sections. A corner or bend section 20 is provided at various locations so that the feed trough may be arranged to form a continuous loop.

A link chain conveyor 22 slides along the bottom 14 of the feed trough 12. The link chain conveyor is composed of a series of flat links 24 which are of a diamond-shape but having rounded corners. A tongue 26 is cut from the mid-portion of each flat link and is bent to interconnect with the adjacent link 24. An opening 28 is provided in the central portion of each flat link from where the tongue has been bent out of position. A slot 29 is also provided in each link to receive the tongue of the adjacent link.

An idler wheel 30 is provided at the bend section 20 along the inside edge of the curved feed trough section. The idler wheel is rotatably mounted on a shaft 32 which projects upwardly from a base 34, as shown in FIGURE 2. The idler wheel has a cylindrical surface 36 at the outer periphery with rib-like projections 38 extending therefrom, as shown in FIGURES 2 and 4. Projecting upwardly from the cylindrical surface is a flange 40, which overlies the upper portion of the link chain conveyor. The rib-like projections are also positioned to be contacted by the link chain conveyor, thus causing the idler wheel to rotate as the link chain moves through the bend section. The idler wheel is enclosed within a housing 42 which surrounds the back portion of the wheel, while a front side wall 44 extends along the curved section of the feed trough linking the side walls 16 of the straight portions. A top cover 46 is positioned over the bend section. Perpendicular support members 48 extend upright from the base 34 and are supported by lateral bracing 50 above the bend section.

Positioned on the inside surface of the front side wall 44 opposite the idler wheel 30 is support member 52 which is fixed to the front side wall by bolts 54. Extending downwardly from the fixed support member 52 are a plurality of guide pins 56. These pins are in the form of shoulder bolts having an enlarged socket head 56a slidably disposed in recesses in the support member 52 and a lower end threaded in an arcuate guide member 58 to support the member 58 from the fixed member 52. A compression spring 60 is fitted around each guide pin and positioned between the support member 52 and the arcuate guide member 58. The arcuate guide member is curved to coincide with the curvature of the bend section and adapted to engage along its bottom surface the upper edge portion of the link chain conveyor 22. The compression springs resiliently urge the arcuate guide member 58 downwardly against and in contact with the link chain conveyor links 24 but permit the guide member 58 to deflect upwardly when lumps of feed or the like pass beneath the guide member. A tapered surface 62 is provided at the forward end of the guide member so that large objects will not be blocked by the end portion as they come into contact with the guide member. Also, the upper surfaces 64 and 66 of the guide member and support member are inclined downwardly towards the center of the feed trough 12 to permit loose granular material to slide onto the link chain conveyor in the event that such material reaches these upper surfaces.

In operation, the link chain conveyor 22 slides along the bottom 14 of the feed trough 12. Loose granular material, such as chicken feed, is conveyed on the upper surface of the flat links 24. The link chain conveyor forms a continuous loop and is driven by drive means not shown. As the chain travels through a corner 20, it passes around the idler wheel 30 and the flat links of the chain contact the rib-like projections 38 on the wheel. Since the wheel moves with the chain as it goes through the corner, a minimum amount of resistance to the movement of the chain is encountered at this particular area. Also as the chain moves through the corner, the flange 40, which overlies the upper surface of the chain, urges the inside edges of the flat links downwardly as they are guided about the bend section.

It will be understood that modifications and variations of the embodiments of the feed conveyor corner guide disclosed herein may be resorted to without departing from the spirit of the invention and the scope of the appended claims.

Having thus described my invention, what I claim as new and desire to protect by Letters Patent is:

1. A poultry feed conveyor comprising a feed trough having a bend section therein, a link chain slidably movable within said feed trough, an idler wheel rotatably mounted adjacent the inside edge of said feed trough at said bend section, said link chain being trained about said idler wheel, and a horizontally disposed arcuate guide member resiliently positioned above said link chain in said bend to press downwardly on the chain to maintain proper alignment of said link chain as it moves around said idler wheel.

2. A poultry feed conveyor comprising a feed trough having a bend section therein, an idler wheel rotatably mounted in said trough at said bend section, a link chain slidably movable in said feed trough and trained about said idler wheel, said idler wheel having a flange portion holding down the inner edge of said link chain adjacent thereto, and a horizontally disposed arcuate guide member resiliently mounted above said link chain opposite said idler wheel to apply a resilient pressure on the upper surface of the outer edge of said link chain and thereby maintain said link chain in proper alignment as it moves about said idler wheel.

3. A poultry feed conveyor comprising a feed trough having a bend section therein, a link chain slidably movable within said feed trough, an idler wheel rotatably mounted in said trough at said bend section, said idler wheel having a flange extending over an edge portion of said link chain adjacent said idler wheel, an arcuate guide member secured to the inner wall of said trough at said bend section and overlying said chain, and spring means urging said guide member downwardly to engage the opposite edge portion of said link chain from said idler wheel whereby said link chain is maintained in a substantially horizontal plane as it moves about said idler wheel.

4. A poultry feed conveyor comprising a feed trough having a right angle bend section therein, a link chain slidably movable in a horizontal plane within said feed trough, an idler wheel rotatably mounted in said trough at said bend section adjacent the inside curved wall of said feed trough, said idler wheel having a flange extending over an edge portion of said link chain and vertical rib members adapted to be engaged by said edge portion of said link chain, and a fixed, horizontally disposed arcuate guide member resiliently positioned above said link chain and engaging the opposite edge portion of said link chain from said idler wheel whereby said link chain is maintained in a substantially horizontal plane as it moves about said idler wheel, said idler wheel being rotated by said link chain as said vertical rib members are engaged by said edge portion of said link chain.

5. A corner guide for a feed conveyor comprising a feed trough having a bend section therein, a link chain slidably movable within said feed trough, an idler wheel rotatably mounted in said trough adjacent the inside edge of said feed trough at said bend section, said idler wheel having a flange extending over an edge portion of said link chain adjacent said idler wheel, a support member mounted in fixed position on the inner wall of said trough opposite said idler wheel, guide pins extending downwardly from said support member, an arcuate guide member having openings therein adapted to receive said guide pins, and compression springs fitted around said guide pins and bearing against said fixed support member and said guide member to resiliently maintain said guide member in contact with the opposite edge portion of said link chain from said idler wheel and thus maintain said link chain in a substantially horizontal plane as it moves about said idler wheel, said springs allowing said guide member to deflect upwardly to prevent jamming of said feed conveyor at said corner guide.

6. A conveyor for loose granular material comprising a trough having a bend section therein defined by an inside radius and an outside radius, a chain slidably movable within said trough, said chain having flat links with leading edges inclined downward to maintain a scraping contact with the floor of said trough, and means to restrict said chain to the floor of said trough including means to hold down the edge of each link adjacent to the inside radius of said bend, and a resilient fixed, horizontally disposed guide member secured to the wall of the trough at the outside radius of said bend to hold down the edge of each link adjacent to said outside radius as said chain links pass through said bend section.

7. A conveyor for loose granular material comprising a trough having a bend section therein defined by an inside radius and an outside radius, a chain slidably movable within said trough, said chain having flat links with leading edges inclined downward to maintain a scraping contact with the floor of said trough, and means to restrict said chain to the floor of said trough including a flanged idler wheel mounted rotatably at said bend to hold the edge of each link adjacent to the inside radius of the bend section and a resilient horizontally disposed, fixed guide member secured to the wall of the trough at the outside radius of said bend to hold down the edge of each link adjacent to said outside radius as said chain links pass through said bend section.

8. In a feed conveyor system, a feed trough having a bend section therein defined by an inside radius and an outside radius, a feed chain slidably movable in said trough, said feed chain being composed of flat links having the leading edges beveled downward toward the floor of the trough, an idler wheel rotatably mounted in said trough at said bend section, said idler wheel having a flange extending over the edge portion of said feed chain that is adjacent to said idler wheel, a fixed, horizontally disposed arcuate guide member secured to the wall of said trough at the outside radius of said bend section and overlying said chain, and spring means urging said guide member downwardly to engage the edge portion of said feed chain opposite said idler wheel whereby a plurality of links of said feed chain is maintained in close contact with the floor of said feed trough at all times.

References Cited by the Examiner
UNITED STATES PATENTS

| | | | |
|---|---|---|---|
| 2,368,114 | 1/45 | Cartlidge | 119—52 |
| 2,591,609 | 4/52 | Roberts et al. | 119—52 |
| 2,683,439 | 7/54 | Markey | 119—52 |
| 2,866,536 | 12/58 | Smallegan | 119—52 |
| 2,918,037 | 12/59 | Polley | 119—52 |
| 2,934,199 | 4/60 | Winkler | 119—52 |
| 3,077,995 | 2/63 | Booth et al. | 198—224 |

SAMUEL KOREN, *Primary Examiner.*

ALDRICH F. MEDBERY, *Examiner.*